US010204083B2

(12) United States Patent
Olson et al.

(10) Patent No.: US 10,204,083 B2
(45) Date of Patent: Feb. 12, 2019

(54) COMPUTER SYSTEMS AND METHODS USING MULTIPLE NEUTRAL TYPE CHARACTERS AS DELIMITERS BETWEEN SEGMENTS IN STRUCTURED, MULTI-SEGMENT DATA VALUES

(71) Applicant: Microsoft Technology Licensing, LLC, Redmond, WA (US)

(72) Inventors: April Marie Olson, Fargo, ND (US); William Leslie Frandsen, Fargo, ND (US); Kimberly Kroetsch, Fargo, ND (US); Dustin James Gustafson, Fargo, ND (US); Russell Brown, Fargo, ND (US); Todd Lefor, Fargo, ND (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 20 days.

(21) Appl. No.: 15/298,985

(22) Filed: Oct. 20, 2016

(65) Prior Publication Data

US 2018/0113844 A1 Apr. 26, 2018

(51) Int. Cl.
*G06F 17/00* (2006.01)
*G06F 17/21* (2006.01)
(Continued)

(52) U.S. Cl.
CPC ........ *G06F 17/214* (2013.01); *G06F 17/2223* (2013.01); *G06F 17/2247* (2013.01); *G06F 17/243* (2013.01)

(58) Field of Classification Search
CPC .......................... G06F 17/214; G06F 17/2223
See application file for complete search history.

(56) References Cited

U.S. PATENT DOCUMENTS 5,113,342 A  5/1992 Zamora
5,761,689 A  6/1998 Rayson et al.
(Continued)

OTHER PUBLICATIONS

Ishida, Richard, "Creating HTML Pages in Arabic, Hebrew and Other Right-to-left Scripts (tutorial)", In Publication of W3C, Mar. 22, 2005, 4 pages.

(Continued)

*Primary Examiner* — Amelia L Tapp
(74) *Attorney, Agent, or Firm* — Mannava & Kang, P.C.

(57) ABSTRACT

A computer system for processing bidirectional characters includes a processor and memory. An application stored in the memory includes instructions that are executable by the processor and memory and that are configured to determine an embedding direction and at least one of output, export or display data including characters using bidirectional code. While at least one of outputting, exporting or displaying the data, the instructions are configured to parse a multi-segment data value including a plurality of segments and a delimiter arranged between adjacent ones of the plurality of segments. The delimiter includes two or more neutral type characters that are arranged immediately adjacent to one another. The delimiter causes the bidirectional code to apply the embedding direction to the delimiters of the multi-segment data value to maintain relative ordering of adjacent ones of the segments in the multi-segment data value.

18 Claims, 9 Drawing Sheets

(51) Int. Cl.
*G06F 17/22* (2006.01)
*G06F 17/24* (2006.01)

(56) References Cited

U.S. PATENT DOCUMENTS

| | | | | |
|---|---|---|---|---|
| 6,910,185 | B1* | 6/2005 | Schwartz | G06F 17/211 |
| | | | | 715/205 |
| 7,120,900 | B2* | 10/2006 | Atkin | G06F 3/018 |
| | | | | 717/117 |
| 8,660,835 | B2* | 2/2014 | Mousaad | G06F 17/27 |
| | | | | 704/8 |
| 9,189,462 | B2 | 11/2015 | Lanin et al. | |
| 9,594,736 | B2* | 3/2017 | Allawi | G06F 17/24 |
| 2003/0110021 | A1* | 6/2003 | Atkin | G06F 9/454 |
| | | | | 704/1 |
| 2009/0063965 | A1 | 3/2009 | Lee | |
| 2010/0318926 | A1 | 12/2010 | Anderson et al. | |
| 2011/0258240 | A1* | 10/2011 | LeFever | G06F 17/3061 |
| | | | | 707/812 |
| 2017/0270090 | A1* | 9/2017 | Kemmel | G06F 17/272 |

OTHER PUBLICATIONS

Portaneri, et al., "Arabization of Graphical User Interfaces", In Publication of John Wiley & Sons, Inc.—International User Interfaces, Aug. 2, 1996, 6 pages.

"Supporting Right-to-Left Languages", https://developer.apple.com/library/content/documentation/MacOSX/Conceptual/BPInternational/SupportingRight-To-LeftLanguages/SupportingRight-To-LeftLanguages.html, Retrieved Date: Sep. 26, 2016, 8 pages.

Secosky, Jason, "A Sampler of What's New in Base SAS® 9.2", In Proceedings of NorthEast SAS Users Group Conference, Sep. 14, 2008, pp. 1-15.

Lefor, Todd, "Support for right-to-left languages: A primer on bidirectional text", https://ax.help.dynamics.com/en/wiki/bidirectional-support/, Jul. 27, 2016, 9 pages.

* cited by examiner

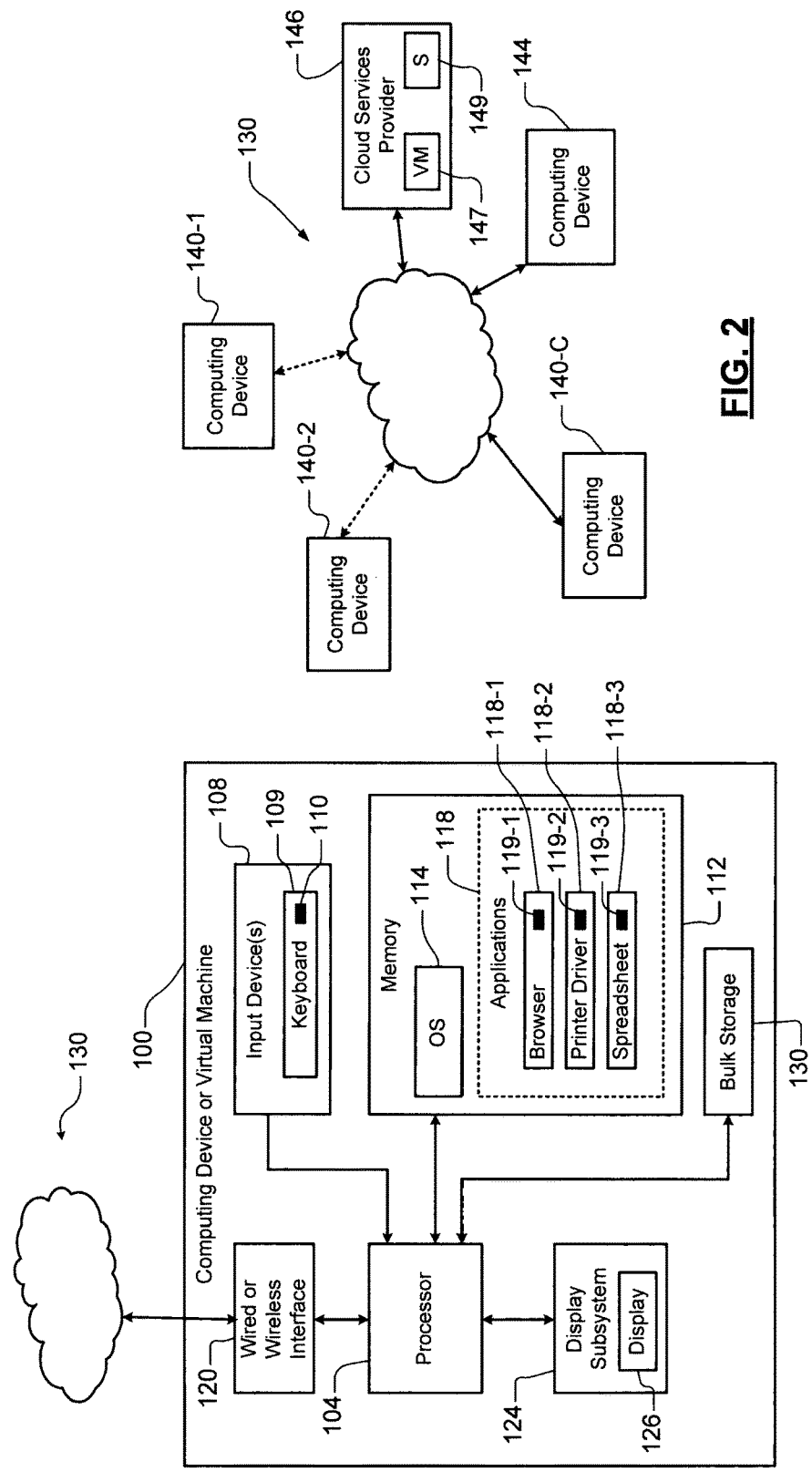

COMPUTER SYSTEMS AND METHODS USING MULTIPLE NEUTRAL TYPE CHARACTERS AS DELIMITERS BETWEEN SEGMENTS IN STRUCTURED, MULTI-SEGMENT DATA VALUES

FIELD

The present disclosure relates to computer systems and methods, and more particularly to computer systems and methods using multiple neutral type characters as delimiters between adjacent segments in structured, multi-segment data values.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Computer systems and software developed for enterprises should be able to handle differences that arise due to the different languages that are used. While text, numerical and other characters in Latin languages such as English, French and Spanish are always read from left-to-right (LTR), other languages such as Hebrew or Arabic are not. In these other languages, text is read from right-to-left (RTL) and numerical characters are read from LTR. In other words, these languages are bidirectional since they include a mixture of RTL and LTR.

Data is stored by computers as encoded data. When displaying or printing characters of a script, the computer identifies characters in the encoded data. The characters or glyphs are associated with the scripts. The order of the characters in memory (logical) may not be the same as the order in which they are displayed (visual). Bidirectional standards such as Unicode® were developed to handle display ordering issues that arise when entering, exporting, displaying and/or printing bidirectional data.

In operation, the computer may generate user interfaces, screens or web pages including forms with one or more input controls such as text boxes, drop-down lists, etc. that prompt a user to enter data. The input controls are usually designed to ensure that the user enters the data correctly and in the proper format. The computer system stores the data that is input either locally or remotely. A user may subsequently request access to the data and the computer retrieves the data and outputs the data to a screen or printer or exports the data to another program or file.

Some data values that need to be entered include multi-segment data values. The multi-segment data values typically include two or more segments that may be separated by a delimiter. Each segment may include text characters, numeric characters and/or other characters. In some situations, the multi-segment data values may need to be structured in the sense that the relative ordering of the adjacent segments should be maintained when using LTR or RTL embedding directions.

In bidirectional data codes, different types of characters are assigned strong, weak or neutral directional behavior. For example, numeric characters are always entered and consumed in a LTR manner. This is true whether they are consumed as numbers representing a numeric value or as a string of numeric characters representing a concept such as an ID number.

Latin characters are also always entered and consumed in a LTR manner. Arabic characters are always entered and consumed in a RTL manner. Some special characters are considered neutral and without direction such as, but not limited to, hyphen (-), bar (|) and period (.). These neutral type characters are commonly used as segment delimiters and take on the directional characteristics of the characters surrounding them.

For example, the multi-segment data value may include two or more segments and each segment may include English, Arabic or numbers. In some cases, an application implementing the bidirectional data standard for display of bidirectional text may add directional formatting characters (that are not displayed) to re-orient the input data into "natural reading order" and subsequently modify the ordering of the multi-segment data value.

For example, a multi-segment data value includes a first segment that names the movie and a second segment that describes the status. In LTR natural reading order the presentation would be seg1-seg2. While in RTL natural reading order, the segments would be seg2-seg1. For example, a multi-segment data value that naturally reads "Episode 1-Now showing" when using mixed language is correctly displayed as "الآن يعرض-Episode 1". That is, the RTL reader will begin on the right part of the string and read "Episode 1" and then read the second part of the string (in Arabic) "Now Showing".

In another example demonstrating undesired display of multi-segment data values, the application is using a RTL language and the user types the following segments sequentially using a single neutral type character separator between each segment value: seg1="123", seg2="456" and seg3="طب". In this example, a combination of segment values being entered in a single string. The user would like to enter three segment values seg1-seg2-seg3. In a RTL language, the user would like to see the segments oriented from the right: seg3-seg2-seg1. In this example, the first two segments are numeric. According to the bidirectional code, numbers always flow from left to right. The input control has no intrinsic insight into the fact that these values are not a single run of characters, but rather two distinct sets of values separated by a hyphen. Therefore the first two segments are treated as a single run of characters in LTR orientation 123-456. The introduction of an Arabic text segment begins a new run of characters. Since Arabic is read RTL and the first run of numbers is LTR, this means that the Arabic run of characters comes AFTER the LTR run of characters and is then placed on the left side of the string. Therefore, seg3-seg1-seg2 is displayed instead of the desired seg3-seg2-seg1.

The neutral character "-" is taking on the characteristics of the data that is surrounding it. In RTL languages, numerals are read LTR. Non-numeric characters are read RTL. With the neutral delimiter "-" between the numeric characters 3 and 4, the bidirectional standard follows the LTR pattern of numeric characters 3 and 4 surrounding the delimiter and outputs طب-123-456 instead of "طب-456-123.

Bidirectional data standards may use a set of directional formatting characters that influence the display ordering of text and that are not actually displayed. To maintain the relative order of the segments in structured, multi-segment data values, the bidirectional data standard requires two directional formatting characters per segment. The formatting characters are used to influence the display ordering of text and are intended to be ignored for text comparisons, numerical analysis or other situations. However the formatting characters may not be ignored and may cause failures when comparing otherwise identical text. The additional formatting characters require additional code, increase bandwidth when sending structured, multi-segment data values and require additional storage when storing structured, multi-segment data values.

One approach for correcting this issue involves padding each segment with directional formatting characters to control the direction of the text and segments. There are often two or more ways to implement the directional formatting characters specified by the bidirectional code. In other words, there are multiple ways to implement the directional formatting in the bidirectional code that would result in the same desired formatting and that may not be identical byte-wise. The differences may tend to cause text comparison issues.

Another approach is to separate each segment into a separate field. This approach, however, will eliminate certain functional capabilities such as combining and displaying the individual segments as a single display string (e.g. for reporting, email or other text-only communication). This approach requires additional effort to store, retrieve and manage the data using database systems. While this approach allows control of the local visual ordering, when the segments are shared with other systems there is no meta information that describes the correct way to display each segment. Therefore, two viewers looking at the same data using the same software display in different languages may have different viewing experiences as there is no intrinsic guidance on how to display the segments.

SUMMARY

A computer system for processing bidirectional characters includes a processor and memory. An application stored in the memory includes instructions that are executable by the processor and that are configured to determine an embedding direction and at least one of output, export or display data including characters using bidirectional code. While at least one of outputting, exporting or displaying the data, the instructions are configured to parse a multi-segment data value including a plurality of segments and a delimiter arranged between adjacent ones of the plurality of segments. The delimiter includes two or more neutral type characters that are arranged immediately adjacent to one another. The delimiter causes the bidirectional code to apply the embedding direction to the delimiters of the multi-segment data value to maintain relative ordering of adjacent ones of the segments in the multi-segment data value.

In other features, the embedding direction corresponds to the embedding direction of the application. The embedding direction is selected from a group consisting of left-to-right (LTR) and right-to-left (RTL). The relative ordering of adjacent ones of the segments in the multi-segment data value is maintained independent of a LTR or a RTL direction of adjacent ones of the plurality of segments.

In other features, the application further comprises instructions to input the multi-segment data value and to ensure the delimiters include the two or more neutral type characters. The application further comprises instructions to input the multi-segment data value and to add a neutral type character when one of the delimiters of the multi-segment data value includes a single neutral type character. The application further comprises instructions to input the multi-segment data value as separate segments and to add the two or more neutral type characters between the segments.

In other features, the application further includes instructions to generate a form to enter the multi-segment data value and to store the multi-segment data value. The application further includes instructions to receive a web page including a form from a remote server, to transmit the form including the multi-segment data value back to the remote server and to receive data from the remote server including the multi-segment data value.

In other features, the delimiters in the multi-segment data value cause the bidirectional code to apply the embedding direction without requiring invisible formatting characters in the multi-segment data value. The processor and memory are provisioned by a cloud services provider. The bidirectional code classifies a directional type of characters as a strong type character, a weak type character and the neutral type character.

In other features, the embedding direction corresponds to the embedding direction of a second application executed by a second computer system remote from the computer system. The computer system outputs and sends a rendered screen including the multi-segment data value to the second computer system. The application implements the bidirectional code.

A non-transitory, tangible computer readable medium for processing bidirectional characters includes instructions to determine an embedding direction of an application. The embedding direction is one of left-to-right (LTR) or right-to-left (RTL). The instructions at least one of output, export or display data including characters using the application and bidirectional code. The data includes a multi-segment data value including a plurality of segments and a delimiter located between adjacent ones of the plurality of segments. The delimiters include two or more neutral type characters that are arranged immediately adjacent to one another. During the at least one of outputting, exporting or displaying, the bidirectional code applies the embedding direction to the multi-segment data value to maintain relative ordering of adjacent ones of the segments in the multi-segment data value using the delimiters and without using invisible formatting characters.

In other features, the non-transitory, tangible computer readable medium includes instructions to ensure that the delimiters include the two or more neutral type characters. The non-transitory, tangible computer readable medium includes instructions for inputting the multi-segment data value. The non-transitory, tangible computer readable medium includes instructions to add a neutral type character when one of the delimiters of the multi-segment data value includes a single neutral type character.

In other features, the non-transitory, tangible computer readable medium includes instructions to input the multi-segment data value as separate segments and add the two or more neutral type characters between the segments.

In other features, the non-transitory, tangible computer readable medium includes instructions to generate a form to enter the multi-segment data value and for storing the multi-segment data value.

In other features, the non-transitory, tangible computer readable medium includes instructions to receive a web page including a form from a remote server, transmit the form including the multi-segment data value back to the remote server, and receive data from the remote server including the multi-segment data value.

A computer system for processing bidirectional characters includes a client computer including a processor and memory. The client computer can be on-premises or a virtual client. A browser application is executed by the processor and memory and includes instructions executable by the processor to determine an embedding direction and to at least one of output, export or display characters using bidirectional code. The browser application receives a web page including a form with an input control for inputting a multi-segment data value including a plurality of segments and a delimiter located between adjacent ones of the plurality of segments. Each of the delimiters includes two or more neutral type characters that are arranged immediately adjacent to one another. The client computer transmits the form to a remote server computer. The client computer receives a web page from the remote server computer including at least one multi-segment data value including delimiters with two or more neutral type characters between adjacent segments. The delimiters in the multi-segment data value cause the bidirectional code to apply the embedding direction to the delimiters of the multi-segment data value to maintain relative ordering of adjacent ones of the segments in the multi-segment data value when performing the at least one of output, export or display.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 1 is a functional block diagram of an example of a computing device according to the present disclosure.

FIG. 2 is a functional block diagram of an example of the distributed communication system according to the present disclosure.

In the drawings, reference numbers may be reused to identify similar and/or identical elements.

DESCRIPTION

Figure 4:
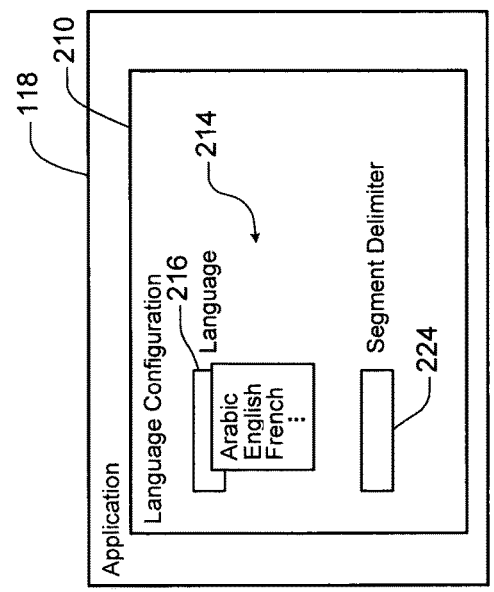
FIG. 4 illustrates a screen including a form for setting the default language and segment delimiter according to the present disclosure.

To eliminate problems associated with relative ordering of structured, multi-segment data values when displaying or outputting LTR or RTL, computer systems and methods according to the present disclosure use two or more neutral type characters as delimiters for segmenting the structured, multi-segment data values. The two or more neutral type characters are processed by applications implementing bidirectional code in such a way that the segments are displayed or otherwise consumed in the correct relative order in either LTR or RTL. In some examples, the delimiters include the same character multiple times or two or more different neutral characters.

More particularly, in bidirectional code such as Unicode®, characters are identified as strong, weak and neutral type characters. Strong type characters include LTR (e.g. alphabetic, syllabic and Han ideographs, non-European and non-Arabic digits), RTL (Hebrew alphabet and related punctuation), and RTL Arabic (Arabic, Thaana and Syriac alphabets and punctuation marks specific to those scripts). Examples of weak type characters include European digits, Eastern Arabic-Indic digits, etc. Examples of neutral type characters include hyphen (-), bar (|), and period (.), although other neutral characters such as those specified by the Unicode® standard can be used.

A single neutral type character is often used as a delimiter for multi-segment data values. Characters with a neutral directionality property take on the directionality of the characters that immediately precede and follow the neutral type character when the directionality of the adjacent characters is the same.

However, if the neutral type character is located between characters having opposite directionality or one side is neutral and the other has directionality, the neutral type character inherits an embedding directionality or base direction. In some examples, embedding directionality or base direction is based on the default language of the application. When applying this property of bidirectional standards to segments of a multi-segment data value that are delimited by a single neutral type character, the segments may be incorrectly reordered.

By surrounding the segments with two or more delimiters that are neutral type characters, the neutral type characters are never located between two directional characters or sequences. Therefore, the embedding directionality is always used and the segments of the structured, multi-segment data value remain in the same relative order for LTR or RTL directions. In other words, the systems and methods described herein alter the directionality property of the bidirectional standard that would otherwise occur if a single neutral type character was used as a delimiter between each segment.

The effect is achieved without requiring complex code to be written and used for the data entry point or at the consumption point. The change in behavior is accomplished in plain sight using visible characters and without the use of other invisible (e.g. non-displayed) directional formatting characters.

Furthermore, adding the second neutral type character as a delimiter is an efficient solution that adds only one character per segment rather than the two or more directional formatting characters added per segment using other approaches. Storing the structured, multi-segment data values including N segments according to the present disclosure requires N fewer characters than other approaches, where N is the number of segments. Furthermore, transmitting the structured, multi-segment data values to the remote server will require less bandwidth since the structured, multi-segment data values are shorter by N characters as compared to other approaches.

The systems and methods according to the present disclosure ensure that two or more neutral type characters are used as a delimiter between adjacent segments in a structured, multi-segment data value when entering the structured, multi-segment data value. In some examples, the structured, multi-segment data value may be entered by a user in a form generated by a local application. In some examples, the structured, multi-segment data value may be entered by a user in a form of a web page (generated by a remote server) in a web browser. In some examples, the structured, multi-segment data value may be stored locally by the application, database, or other data store associated with the user's computer or transmitted to remote storage. For example, the remote storage may include a database or other data store associated with a remote server or cloud service provider.

Once the structured, multi-segment data value is entered correctly with the two or more neutral type characters as a delimiter, the structured, multi-segment data value will be output, printed, exported or displayed correctly at one or more consumption points. For example, the consumption points may include read-only displays, interactive queries, filtering and sorting, reporting, exporting, business intelligence and analytical uses, etc. In some examples, the exporting may include spreadsheet or database programs. For example only, the spreadsheet program may include Microsoft® Excel®.

The systems and methods described herein can be implemented in a wide variety of architectures. For example, an on-premises computer system can generate the multi-segment data values, store them locally and output them to a display or printer. For example, a virtual machine implemented by a cloud services provider can generate the multi-segment data value, store the multi-segment data value in cloud storage and output the multi-segment data value to a display or printer at another location where the user or another user is located. For example, a client computer can receive a web page with a form for entering the multi-segment data value, transmit the form to a remote server that stores the multi-segment data value, and receive another web page with the multi-segment data value. In yet another example, the remote server outputs data (using the bidirectional code) including the multi-segment data value and sends a fully rendered page to another computer. While additional details relating to some of these examples are presented below, skilled artisans will appreciate that there are other ways of implementing the systems and methods described herein.

Referring now to FIG. 1, a simplified example of a computing device 100 is shown. The computing device 100 can be a physical machine or a virtual machine provisioned by a cloud services provider. The computing device 100 typically includes a central processing unit (CPU) or processor 104 and an input device 108 such as a keypad, touchpad, mouse, etc. In some examples, the input device 108 includes a keyboard 109 including one or more keys or buttons 110 that allow selection of an input language or selection between two or more languages. In some examples, the embedding direction is determined by the language selection via the keyboard.

The computing device 100 further includes memory 112 such as volatile or nonvolatile memory, cache or other type of memory. The computing device 100 further includes bulk storage 130 such as flash memory, a hard disk drive (HDD) or other bulk storage. The bulk storage 130 can be local storage or remote storage.

The processor 104 of the computing device 100 executes an operating system 114 and one or more applications 118. In some examples, the applications 118 include a browser application 118-1, a printer driver 118-2, a spreadsheet application 118-3, etc. The one or more applications 118 implement bidirectional code to handle display or other output (including positioning) of characters that run from LTR or RTL. For example, the browser application 118-1, the printer driver 118-2, or the spreadsheet application 118-3 may implement bidirectional code identified at 119-1, 119-2, or 119-3, respectively (collectively bidirectional code 119). In other examples, the application 118 includes a database. In some examples, the bidirectional code may include one or more portions of the Unicode® standard. In some examples, the bidirectional code is invoked by the application, is implemented as an application that is separate from the application 118, or as a plug-in to the application 118.

As used herein, a multi-segment data value refers to a data value including multiple segments that are separated by a data delimiter. Each segment of the multi-segment data value can include one or more characters such as text, numbers, symbols, etc. Some of the characters have LTR or RTL directionality. As used herein, the term structured means that the relative ordering of the segments of the multi-segment data value needs to be the same independent of a direction of a default language of the user application or the default language of a computer where the multi-segment data value is ultimately consumed.

The computing device 100 further includes a wired interface (such as an Ethernet interface) and/or wireless interface (such as a Wi-Fi, Bluetooth, near field communication (NFC) or other wireless interface (collectively identified at 120)) that establish a communication channel over the distributed communication system 130. The computing device 100 further includes a display subsystem 124 including a display 126.

Referring now to FIG. 2, a simplified example of a distributed communications system 130 is shown. The distributed communications system 130 may include a local area network (LAN), a wide area network (WAN) such as the Internet or other type of network. In FIG. 2, one or more computing devices 140-1, 140-2, . . . 140-C (collectively computing devices 140) (where C is an integer greater than or equal to one) may act as clients and communicate with a computing device 144 acting as a server via the distributed communications system 130. Alternately, the computing devices 140 may access virtual machines 147 and/or storage 149 provisioned by a cloud services provider 146. The computing devices 140 and the computing device 144 may have wireless and/or wired connections to the distributed communications system 130.

Figure 3:
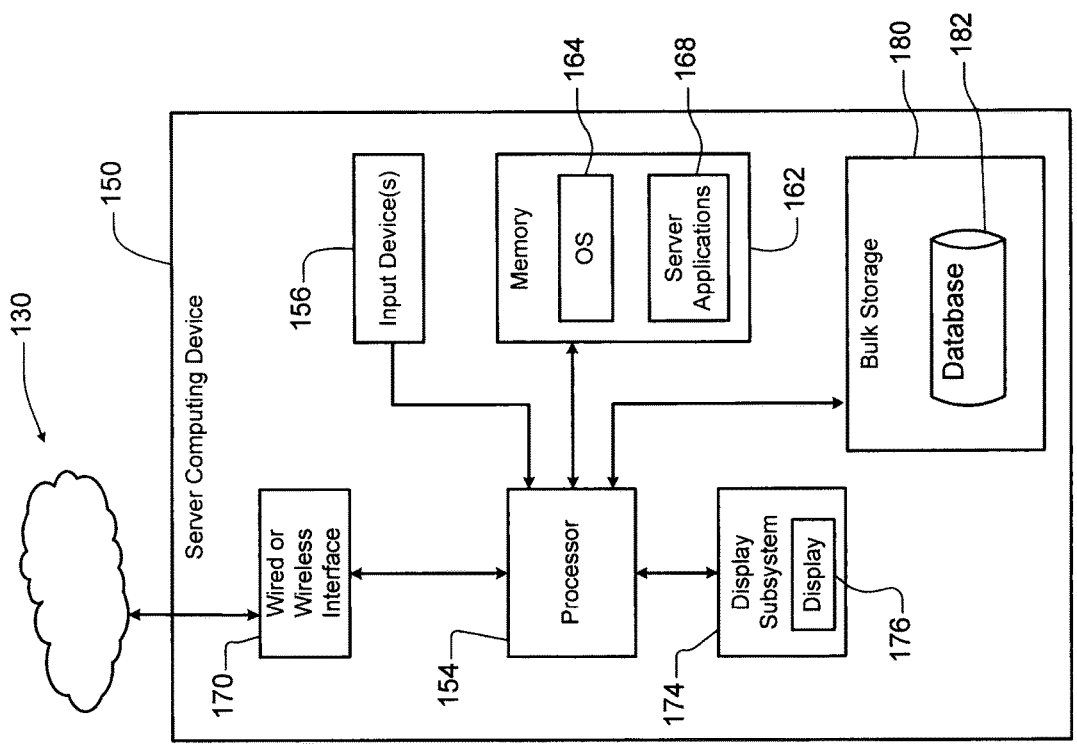
FIG. 3 is a functional block diagram of an example of a server computing device according to the present disclosure.

Referring now to FIG. 3, a simplified example of a server computing device 150 is shown. The server computing device 150 typically includes a central processing unit (CPU) or processor 154 and an input device 156 such as a keypad, touchpad, mouse, etc. The server computing device 150 further includes memory 162 such as volatile or nonvolatile memory, cache or other type of memory. The server computing device 150 further includes bulk storage 180 such as flash memory, a hard disk drive (HDD) or other bulk storage.

The processor 154 of the server computing device 150 executes an operating system 164 and one or more server applications 168. The server computing device 150 further includes a wired interface (such as an Ethernet interface) and/or wireless interface (such as a Wi-Fi, Bluetooth, near field communication (NFC) or other wireless interface (collectively identified at 170)) that establish a communication channel over the distributed communication system 130. The server computing device 150 further includes a display subsystem 174 including a display 176 and bulk storage 180 such as flash memory, a hard disk drive (HDD) or other bulk storage. A database 182 may be stored locally in the bulk storage or remotely in a storage array.

Referring now to FIG. 4, the application 118 generates a screen, form or dialog box 210 that includes one or more input controls 214. For example, the input controls 214 include a first input control 216 such as a drop-down dialog box for selecting a default language for the application 118. The input controls 214 may further include a second input control 220 for inputting a default delimiter for multi-segment data values. In some examples, the default delimiter includes two or more neutral type characters. In some examples, the second input control 220 requires the input to include two or more neutral type characters.

Figure 5:
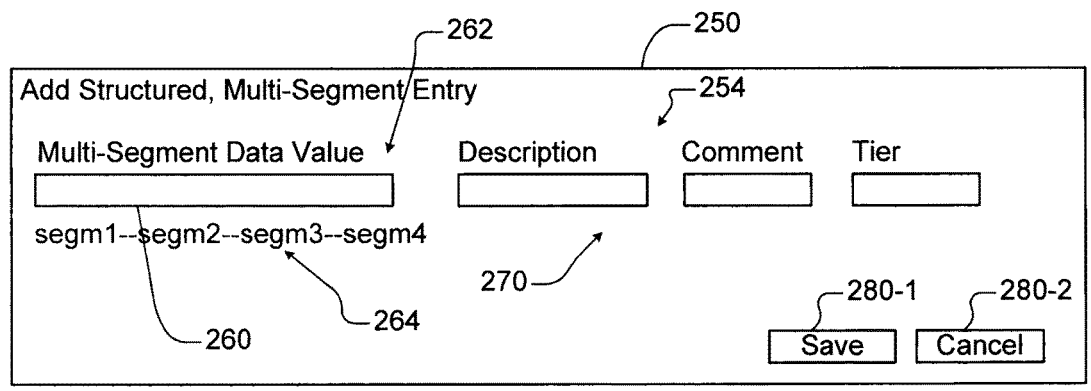
FIGS. 5-7B illustrate examples of forms for entering a multi-segment data value according to the present disclosure.

Referring now to FIG. 5, the application 118 selectively generates a user interface 250 including a screen, form or dialog box to add a structured, multi-segment data value. The user interface 250 includes one or more control inputs generally identified at 254. The multi-segment data value is input using a control 260. The control 260 may include text descriptors 262 and 264 to identify the type of value to be entered and the format of the entry, respectively. For example, the segments are shown with a delimiter including "--" (two hyphens) to prompt the user to use this format during input of the segments segm1, segm2, segm3, and segm4. In some examples, the generic descriptor segm1, segm2, segm3, and segm4 are replaced with descriptors that specify the type of data to be entered in the particular segment. As can be appreciated, in this example, the user manually enters the delimiter that includes two or more neutral type characters between the segments. In addition, the user interface 250 may also prompt entry of other data using one or more additional controls generally identified at 270. Buttons 280-1 and 280-2 may be used to save or cancel, respectively.

Figure 6:
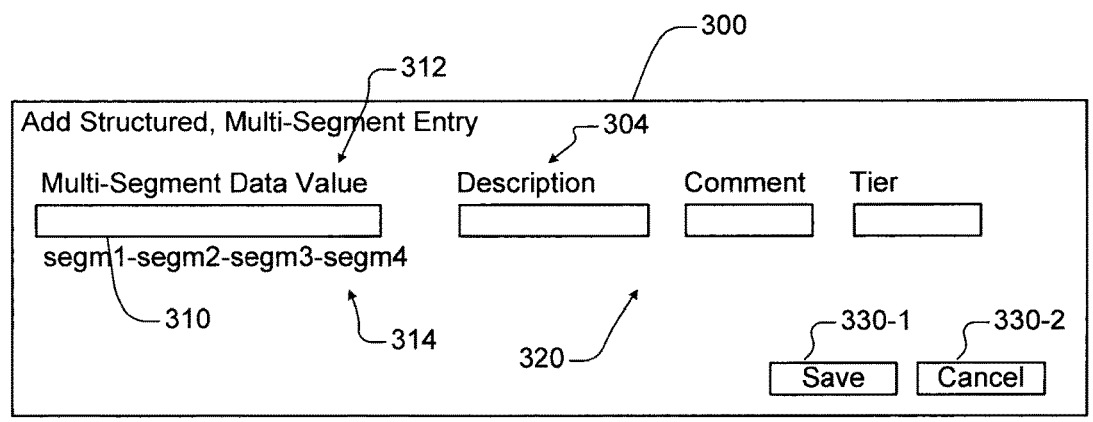

Referring now to FIG. 6, the application 118 generates an interface 300 including a screen, form or dialog box to add a structured, multi-segment data value. The user interface 300 includes one or more control inputs generally identified at 304. The multi-segment data value is input using a control 310. The control may include text descriptors 312 and 314 to identify the type of value to be entered and the format of the entry, respectively. For example, the segments are shown with a delimiter including "-" (single hyphen) to prompt the user to use this delimiter during input of the segments segm1, segm2, segm3, and segm4. In some examples, the generic descriptor segm1, segm2, segm3, and segm4 are replaced with descriptors that specify the type of data to be entered in the particular segment. As can be appreciated, in this example, the user manually enters a single neutral type character as a delimiter between the segments and the application automatically adds the second neutral type character. In addition, the interface 300 may also prompt entry of other data using controls generally identified at 320. Buttons 330-1 and 330-2 may be used to save or cancel, respectively.

Figure 7A:
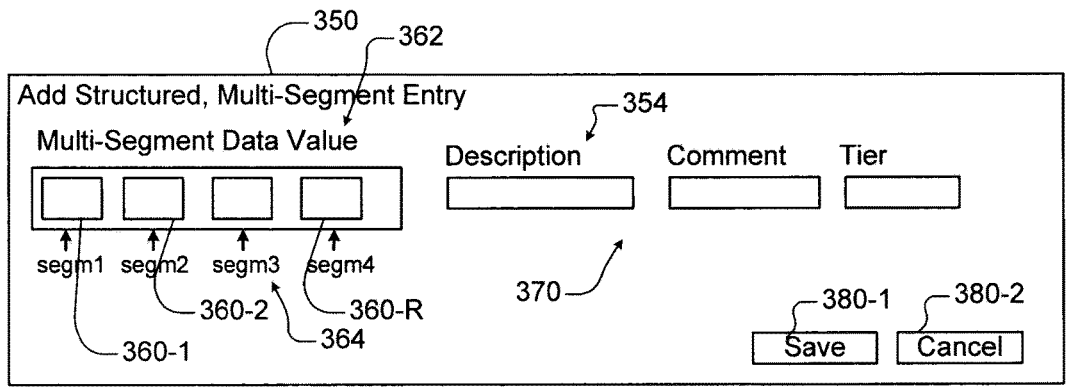

Referring now to FIG. 7A, the application 118 generates a user interface 350 including a screen, form or dialog box to add a structured, multi-segment data value. The user interface 350 includes one or more control inputs generally identified at 354. The multi-segment data value is input using multiple controls 360-1, 360-2, . . . , 360-R (collectively controls 360). Each of the controls 360 may include one or more text descriptors 362, 364 to identify the type of value to be entered and the format of the entry, respectively. After all of the segments are entered, the application 118 adds a delimiter including a two or more neutral type characters. Buttons 380-1 and 380-2 may be used to save or cancel, respectively.

For example, the individual segments are shown to prompt the user to enter the segments individually. As can be appreciated, in this example, after the segments are entered and a save button is selected, the application adds the delimiter including two or more neutral delimiters. In addition, the user interface 350 may also prompt entry of other data using controls generally identified at 370.

Figure 7B:
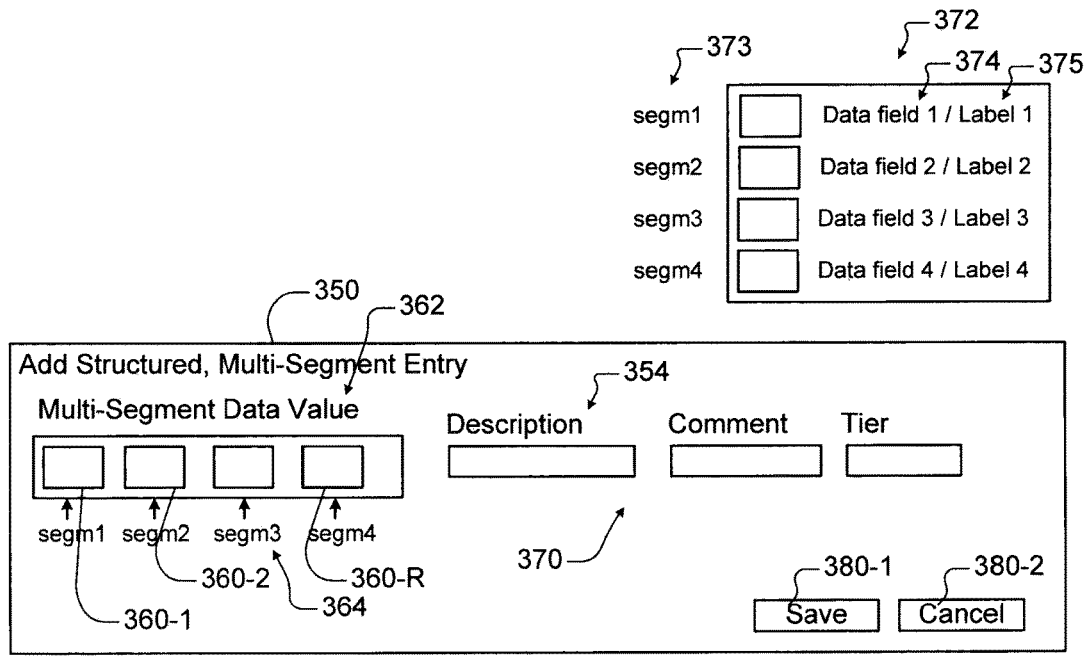

Referring now to FIG. 7B, the segments may be represented in a vertical configuration within a window or frame 372. The window or frame 372 may include segment, data and label descriptors 373, 374, 375, respectively to provide assistance. For example, this configuration may be used for data entry, display, or other purposes to associate segments with data fields or labels that indicate categories of data (e.g., customer name, product type, product ID, price, business department, expense category, etc.).

Figure 8:
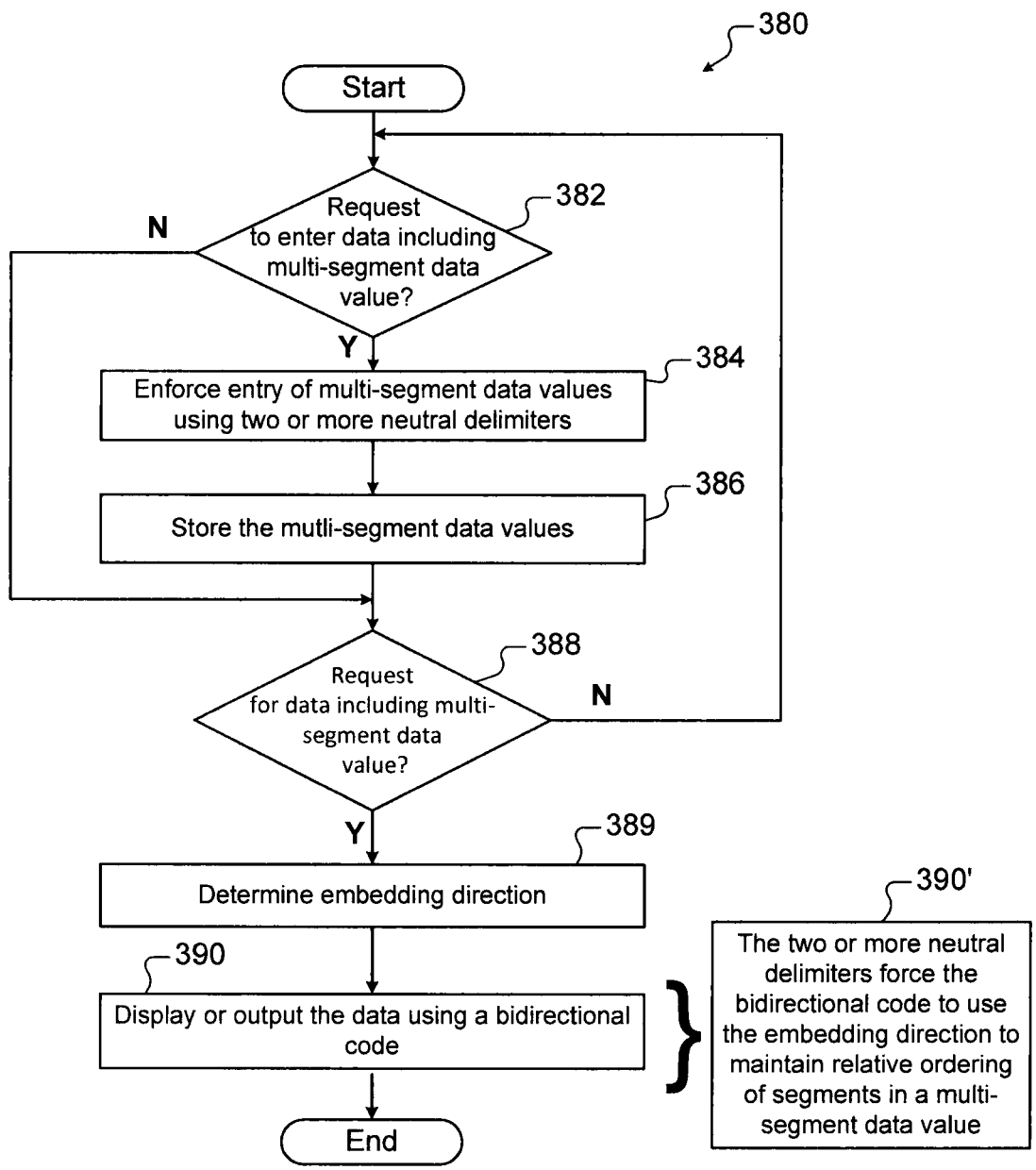
FIGS. 8-10 are flowcharts illustrating examples of methods for entering and displaying or outputting a multi-segment data value in various configurations according to the present disclosure.

Referring now to FIG. 8, a method 380 for entering and storing structured, multi-segment data values is shown. At 382, the method determines whether a request to enter data including a multi-segment data value is received. At 384, the method provides an input interface for the multi-segment data value and enforces entry of the multi-segment data value using two or more neutral delimiters. In some examples, other related data may be entered using the same input interface. At 386, the method stores the multi-segment data values either locally or remotely. If a request for one or more of the multi-segment data values is received at 388, the method determines the embedding direction at 389. At 390, the method outputs or displays data including the one or more multi-segment data values using bidirectional code associated with the application.

As part of 390, as the multi-segment data values are processed by the bidirectional code, the two or more neutral type characters in the delimiters between adjacent segments force the bidirectional code to use the embedding direction to maintain relative ordering of segments in a multi-segment data value as shown at 390'. In other words, as the bidirectional code parses the multi-segment data, multiple neutral characters are detected between segments, which causes ordering of the segments according to the embedding direction.

Figure 9:
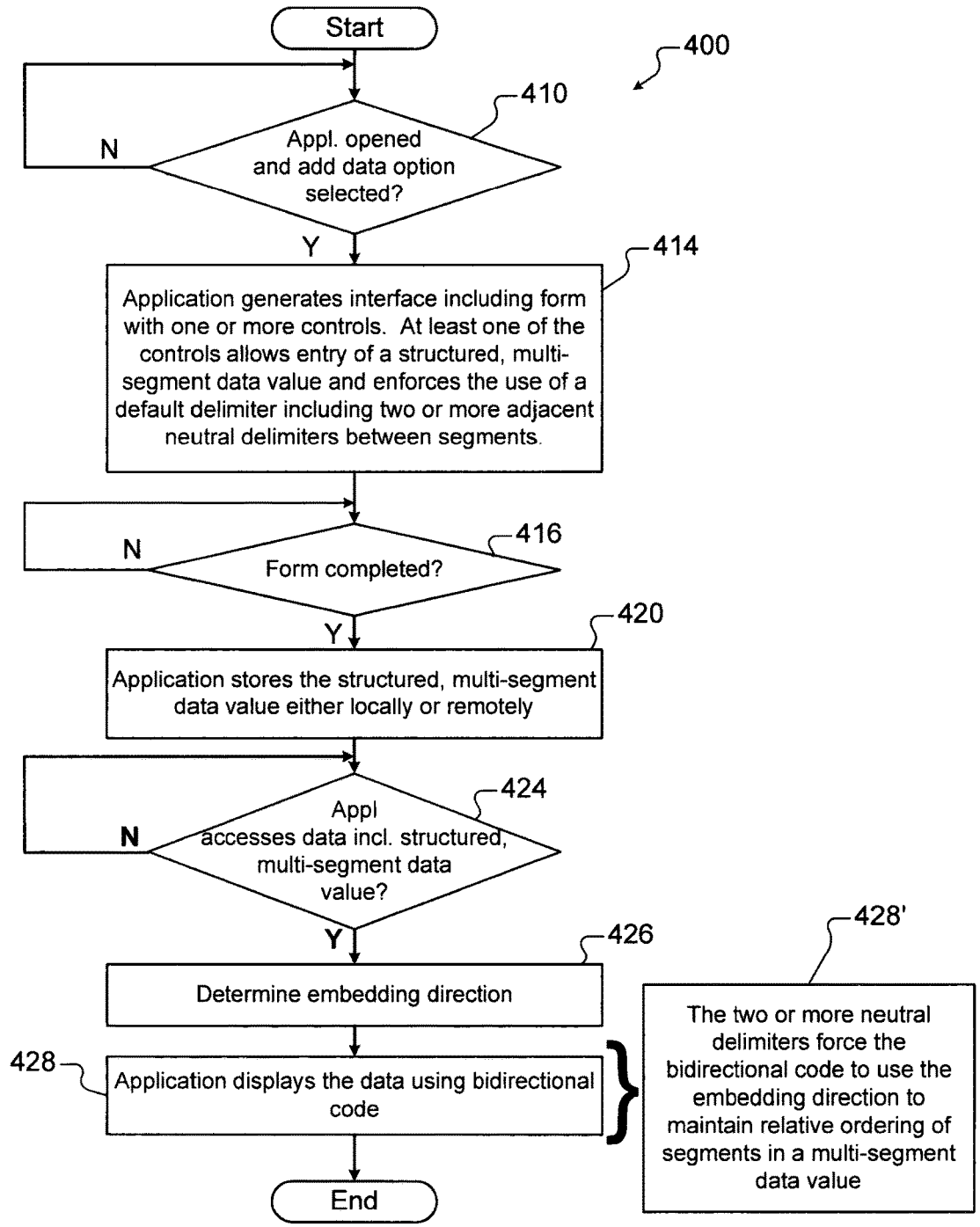

Referring now to FIG. 9, another method 400 for entering and storing structured, multi-segment data values is shown. In this example, a computing device executes a local application and stores the multi-segment data values either locally or remotely. At 410, the method determines whether the application is opened and an add data option is selected. When 410 is true, the method generates a user interface such as a screen, dialog box or form including an input control. The input control allows entry of a structured, multi-segment data value and enforces the use of a default delimiter including two or more neutral type characters as delimiters between adjacent segments.

At 416, the method determines whether the form is completed. When 416 is true, the method continues at 420 and the application stores the structured, multi-segment data value either locally or remotely. At 424, the method determines whether the application accesses data including one or more of the structured, multi-segment data values. If a request for one or more of the multi-segment data values is received at 424, the application determines the embedding direction at 426. At 428, the application outputs or displays data including the one or more multi-segment data values using bidirectional code associated with the application.

As part of 428, as the multi-segment data values are processed by the bidirectional code, the two or more neutral type characters in the delimiters between adjacent segments force the bidirectional code to use the embedding direction to maintain relative ordering of segments in a multi-segment data value as shown at 428'. In other words, as the bidirectional code parses the multi-segment data, multiple neutral characters are detected between segments, which causes ordering of the segments according to the embedding direction.

Figure 10:
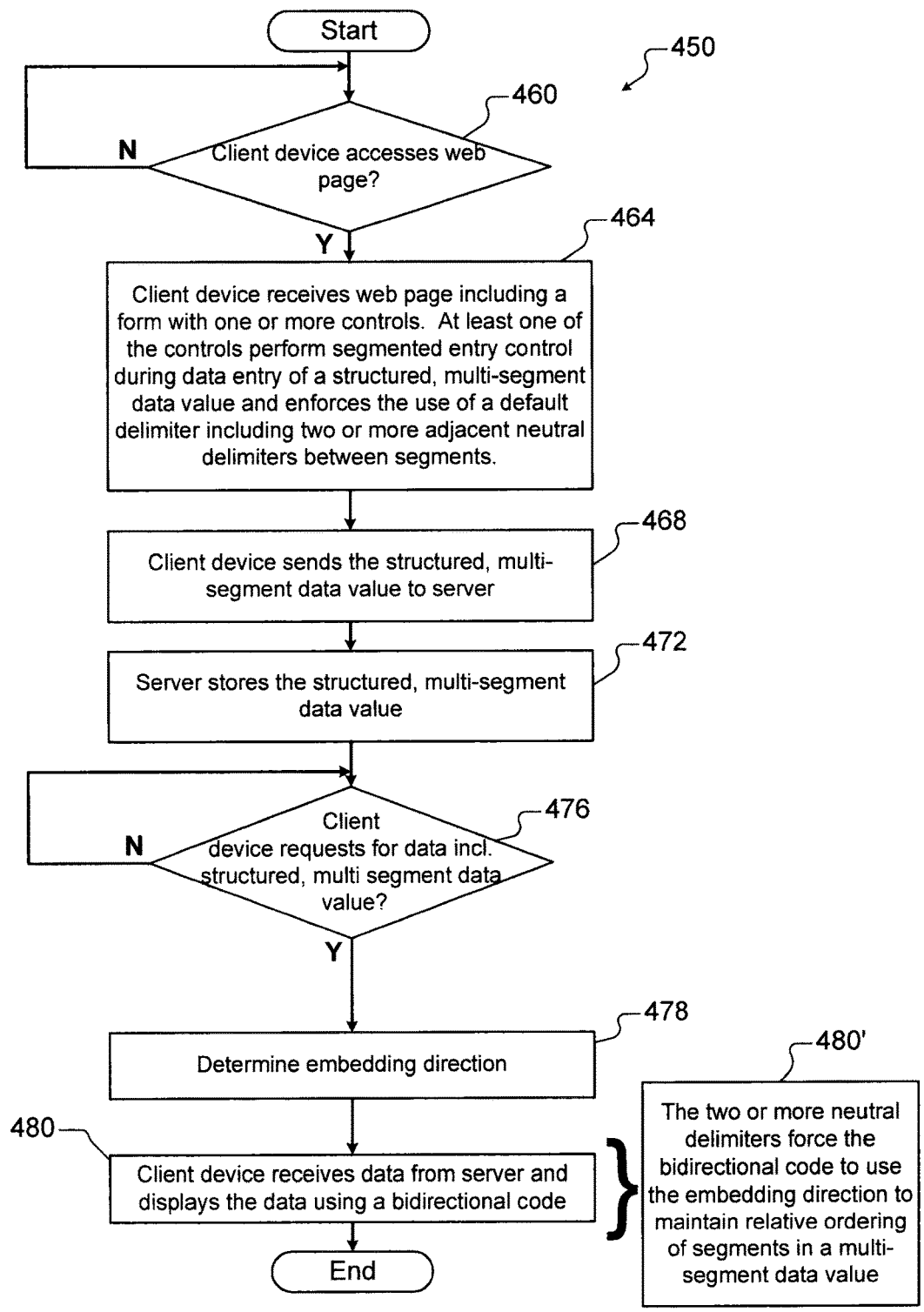

Referring now to FIG. 10, another method 450 for entering and storing structured, multi-segment data values is shown in a client-server environment. In this example, a client computing device accesses a webpage. At 464, the client computing device receives a webpage including a form with one or more input controls. At least one of the controls performs segmented entry control during data entry of a structured, multi-segment data value. The segmented entry control enforces the use of the default delimiter including two or more adjacent neutral type characters between segments.

At 468, the client computing device sends one or more structured, multi-segment data values to the server. At 472, the server stores the one or more structured, multi-segment data values. At 476, the method determines whether the computing device requests data including one or more of the multi-segment data values. If a request for one or more of the multi-segment data values is received at 476, the method determines the embedding direction at 478. At 480, the client device outputs or displays data including the one or more multi-segment data values using bidirectional code associated with the application.

As part of 490, as the multi-segment data values are processed by the bidirectional code, the two or more neutral type characters in the delimiters between adjacent segments force the bidirectional code to use the embedding direction to maintain relative ordering of segments in a multi-segment data value as shown at 490'. In other words, as the bidirectional code parses the multi-segment data, multiple neutral characters are detected between segments, which causes ordering of the segments according to the embedding direction.

Figure 12:
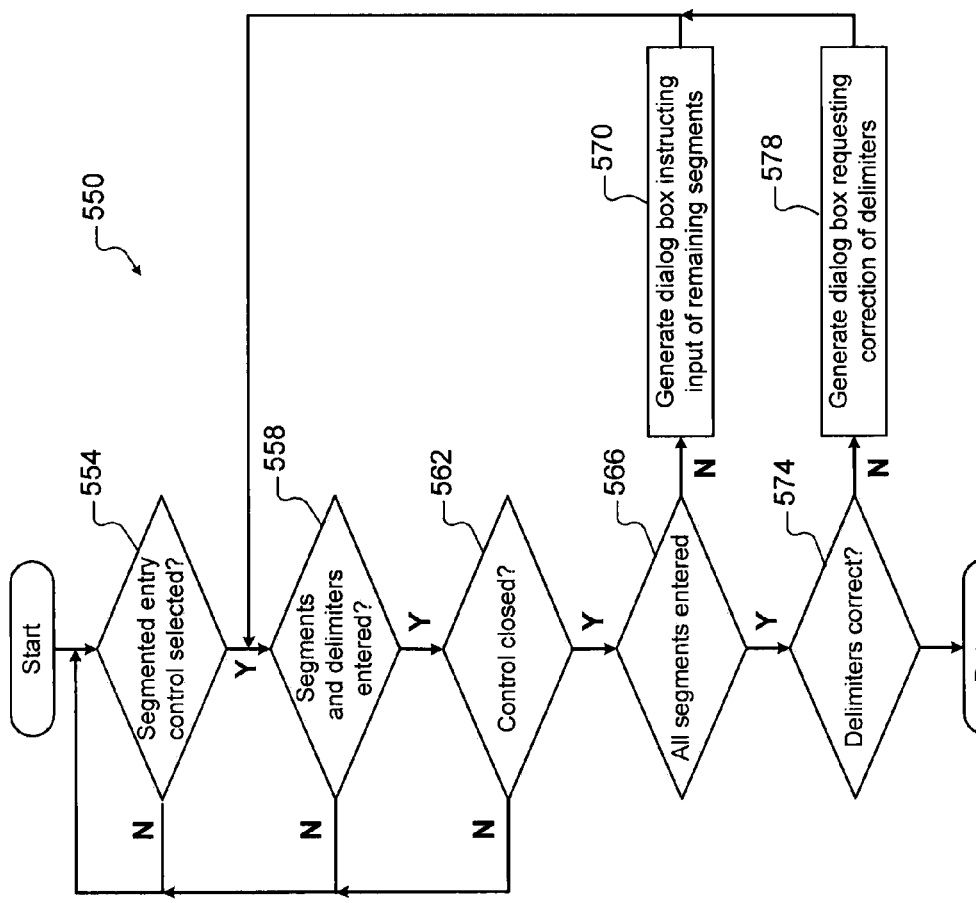
FIGS. 11-12 are flowcharts illustrating examples of methods for entering multi-segment data values according to the present disclosure.
Figure 11:
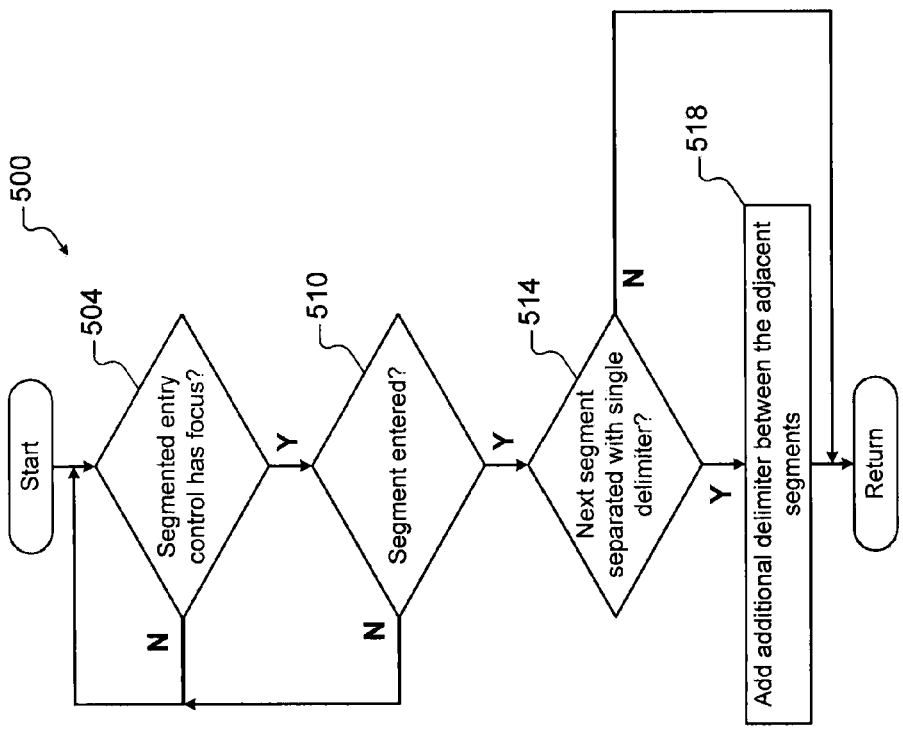

Referring now to FIGS. 11 and 12, examples of methods for controlling entry of the segments are shown, although other methods may be used. In FIG. 11, a method 500 may be used to add a second neutral type character to the delimiters in cases where a single neutral type character is entered by the user. At 504, the method determines whether the segmented entry control is selected or has focus. When 504 is true, the method determines whether a segment has been entered. When 510 is true, the method determines whether the next segment is separated by a single neutral type character or a single delimiter. When 514 is true, the method adds an additional neutral type character as a delimiter between the adjacent segments at 518.

In FIG. 12, a method 550 may be used to ensure that all of the segments are entered and all of the delimiters are correct. At 554, the method determines whether a segmented entry control is selected. At 558, the method determines whether the segments and delimiters have been entered. When 558 is true, the method determines whether the control has been closed. When 562 is true, the method 550 determines whether all of the segments have been entered. If 566 is false, the method generates a dialog box or other notification instructing input of the remaining segments at 570. When 566 is true, the method continues at 574 and determines whether the delimiters that have been used are correct. When 574 is false, the method 550 generates a dialog box or other notification instructing correction of the delimiters at 578.

Figure 13:
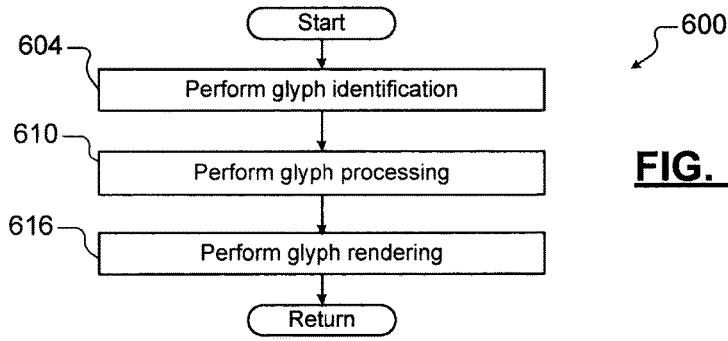
FIGS. 13-14 are flowcharts illustrating a simplified portion of bidirectional code for displaying or outputting multi-segment data values.
Figure 14:
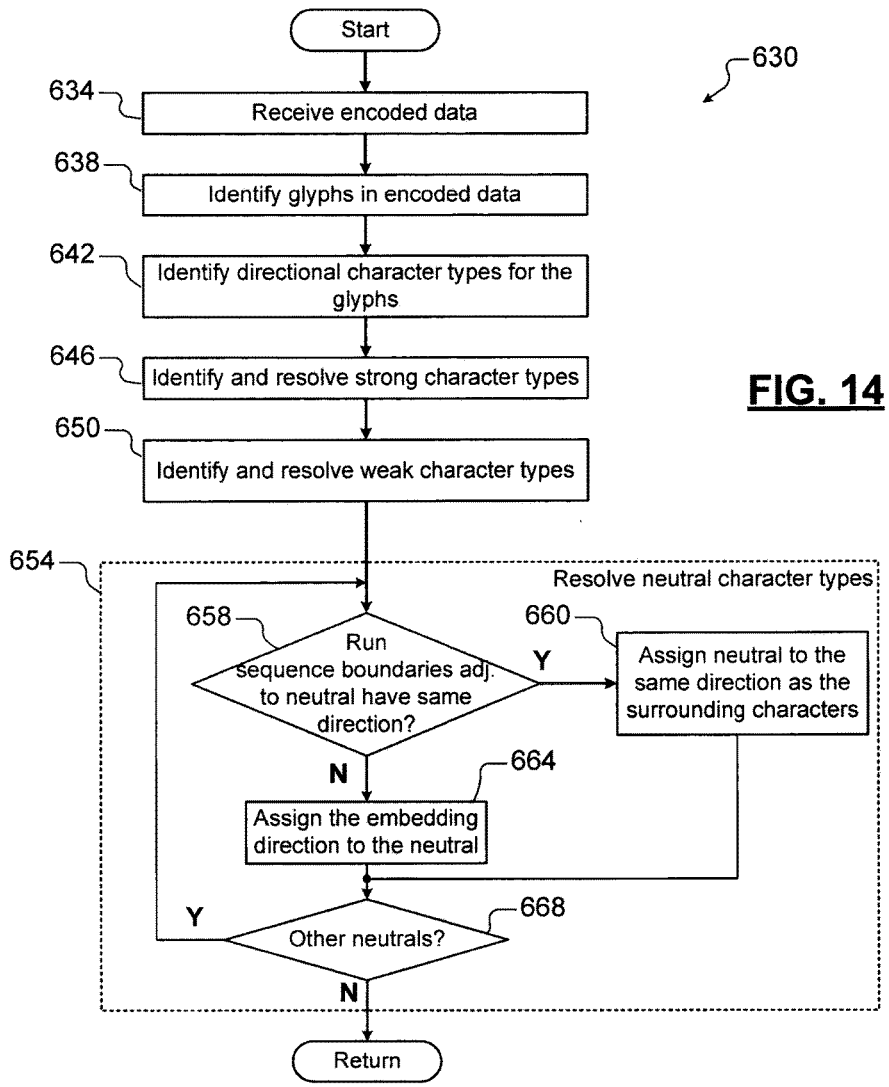

Referring now to FIGS. 13 and 14, methods 600 and 630, respectively, are shown for performing a portion of the bidirectional code for processing the multi-segment data values. In these portions of the bidirectional code, the bidirectional code parses encoded data to identify characters, processes the characters and renders them. During this processing, the bidirectional code parses the multiple neutral characters between segments, which causes ordering of the segments according to the embedding direction. In FIG. 13, the method 600 includes performing glyph or character identification at 604. In other words, the bidirectional algorithm translates the encoded data including a string of binary bits into a character. The method 600 performs glyph or character processing at 610, which is further described below in FIG. 14. The method 600 performs glyph or character rendering at 616, which involves output that is in the proper LTR or RTL visual format for a display, file or other consumption point.

In FIG. 14, the method 630 illustrates portions of the bidirectional code that are used to process and display the multi-segment data values. At 634, encoded data including the multi-segment data values is received. At 638, glyphs are identified in the encoded data corresponding to the multi-segment data values. At 642, directional character types are identified for the glyphs. At 646, the bidirectional algorithm identifies and resolves strong type characters. At 650, the bidirectional algorithm identifies and resolves weak type characters. At 654, the bidirectional algorithm identifies and resolves neutral type characters.

At 658, the bidirectional algorithm determines whether run sequence boundaries adjacent to a first one of the neutral type characters have the same directionality. If 658 is true, the bidirectional code assigns the neutral type character to the same direction as the surrounding characters at 660. If 658 is false, the bidirectional code assigns the embedding direction to the neutral type character at 664. If there are other neutral type characters as determined at 668, the method returns to 658. Otherwise the method returns.

As was described above, the use of a delimiter including two or more neutral type characters forces the bidirectional code to default to the embedding direction since the run sequences will always have at least one neutral type character on one side thereof. Therefore, the run sequence including the multi-segment data values will always default to the embedding direction and will maintain relative ordering whether the sequence is LTR or RTL.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encode instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A computer system for processing bidirectional characters, comprising:
a processor;
memory; and
an application stored in the memory including instructions that are executable by the processor and that are configured to:
determine an embedding direction, wherein the embedding direction is a direction of a language of the application;
at least one of output, export or display data including characters using a bidirectional code;
input a multi-segment data value including a plurality of segments and a delimiter arranged between adjacent ones of the plurality of segments;
add a neutral type character when one of the delimiters of the multi-segment data value includes a single neutral type character; and
parsing the multi-segment data value while at least one of outputting, exporting or displaying the data,
wherein the delimiter includes two or more neutral type characters that are arranged immediately adjacent to one another,
wherein the delimiter excludes directional formatting characters, and
wherein the delimiter causes the bidirectional code to apply the embedding direction to the delimiters to maintain relative ordering of adjacent ones of the segments in the multi-segment data value.

2. The computer system of claim 1, wherein the embedding direction is selected from a group consisting of left-to-right (LTR) and right-to-left (RTL).

3. The computer system of claim 1, wherein the relative ordering of adjacent ones of the segments in the multi-segment data value is maintained independent of a left-to-right (LTR) or a right-to-left (RTL) direction of adjacent ones of the plurality of segments.

4. The computer system of claim 1, wherein the application further comprises instructions to input the multi-segment data value and to ensure the delimiters include the two or more neutral type characters.

5. The computer system of claim 1, wherein the application further comprises instructions to input the multi-segment data value as separate segments and to add the two or more neutral type characters between the segments.

6. The computer system of claim 1, wherein the application further includes instructions to generate a form to enter the multi-segment data value and to store the multi-segment data value.

7. The computer system of claim 1, wherein the application further includes instructions to receive a web page including a form from a remote server, to transmit the form including the multi-segment data value back to the remote server and to receive data from the remote server including the multi-segment data value.

8. The computer system of claim 1, wherein the delimiters in the multi-segment data value cause the bidirectional code to apply the embedding direction without requiring invisible formatting characters in the multi-segment data value.

9. The computer system of claim 1, wherein the processor and memory are provisioned by a cloud services provider.

10. The computer system of claim 1, wherein the bidirectional code classifies a directional type of characters as a strong type character, a weak type character and the neutral type character.

11. The computer system of claim 1, wherein the embedding direction corresponds to the embedding direction of a second application executed by a second computer system remote from the computer system and wherein the computer system outputs and sends a rendered screen including the multi-segment data value to the second computer system.

12. The computer system of claim 1, wherein the application implements the bidirectional code.

13. A non-transitory, tangible computer readable medium for processing bidirectional characters, comprising instructions for:
receiving a multi-segment data value including a plurality of segments and a delimiter located between adjacent ones of the plurality of segments;
adding a neutral type character when one of the delimiters of the multi-segment data value includes a single neutral type character;
ensuring that the delimiters includes two or more neutral type characters that are arranged immediately adjacent to one another, wherein the delimiters exclude directional formatting characters;
receiving a request for the data; and
invoking a bidirectional code configured to use the delimiter to apply an embedding direction to the multi-segment data value to order the adjacent ones of the segments in the multi-segment data value, wherein the embedding direction is a direction of a language of an application comprising the instructions.

14. The non-transitory, tangible computer readable medium of claim 13, further comprising instructions for determining the embedding direction of the application, wherein the embedding direction is one of left-to-right (LTR) or right-to-left (RTL).

15. The non-transitory, tangible computer readable medium of claim 13, further comprising instructions for adding the two or more neutral type characters between the segments.

16. The non-transitory, tangible computer readable medium of claim 13, further comprising instructions for generating a form to enter the multi-segment data value and for storing the multi-segment data value.

17. The non-transitory, tangible computer readable medium of claim 13, further comprising instructions for:
receiving a web page including a form from a remote server;
transmitting the form including the multi-segment data value back to the remote server; and
receiving data from the remote server including the multi-segment data value.

18. A computer system for processing bidirectional characters, comprising:
a client computer including a processor and memory; and
a browser application executed by the processor and memory and including instructions executable by the processor to determine an embedding direction and to at least one of output, export or display characters using bidirectional code,
wherein the embedding direction is a direction of a language of the browser application,
wherein the browser application receives a web page including a form with an input control for inputting a multi-segment data value including a plurality of segments and a delimiter located between adjacent ones of the plurality of segments,
wherein a neutral type character is added when one of the delimiters of the multi-segment data value includes a single neutral type character,
wherein each of the delimiters includes two or more neutral type characters that are arranged immediately adjacent to one another,
wherein the delimiter excludes directional formatting characters,
wherein the client computer transmits the form to a remote server computer,
wherein the client computer receives a web page from the remote server computer including at least one multi-segment data value including delimiters with two or more neutral type characters between adjacent segments, and
wherein the delimiters in the multi-segment data value cause the bidirectional code to apply the embedding direction to the delimiters of the multi-segment data value to maintain relative ordering of adjacent ones of the segments in the multi-segment data value when performing the at least one of output, export or display.

* * * * *